UNITED STATES PATENT OFFICE.

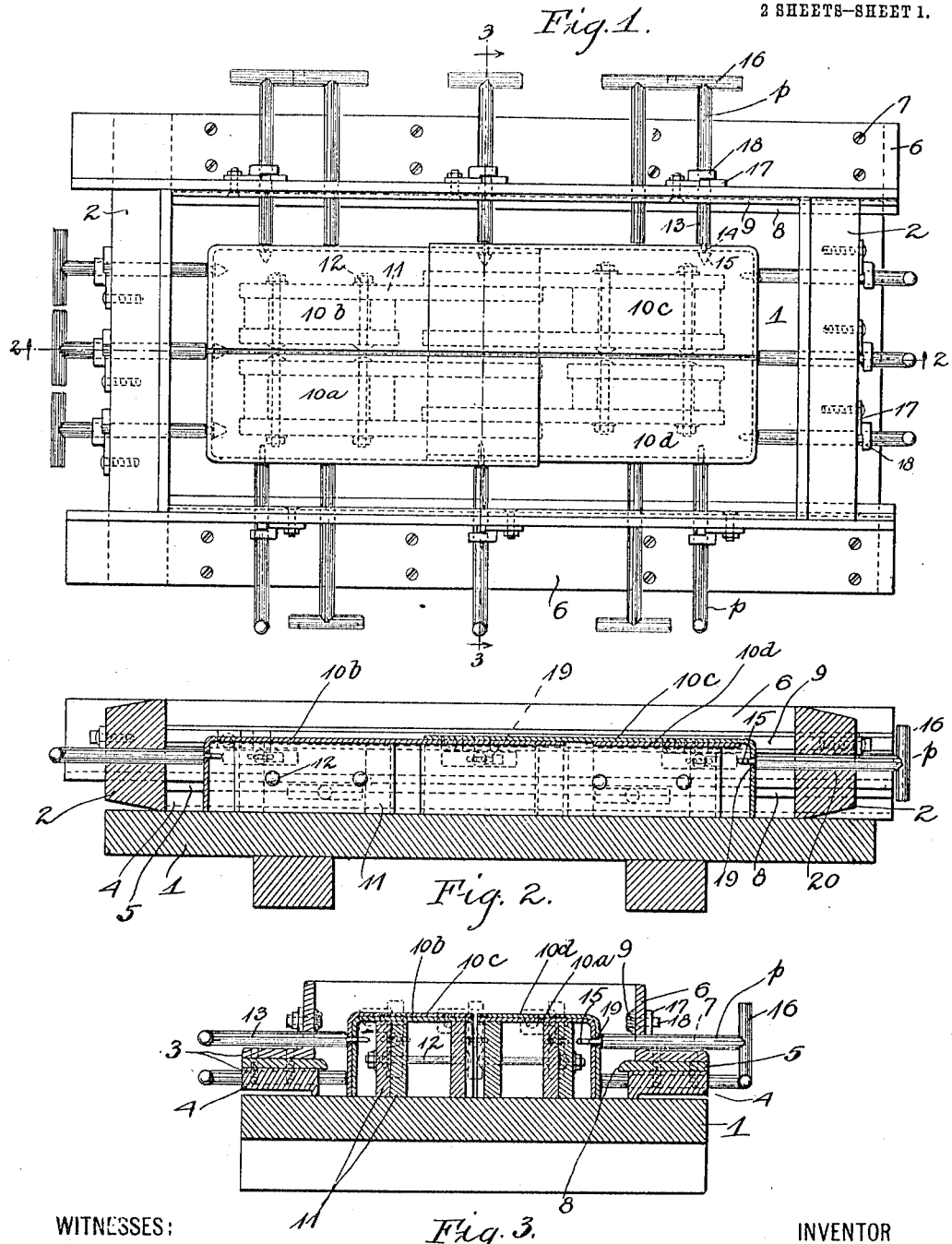

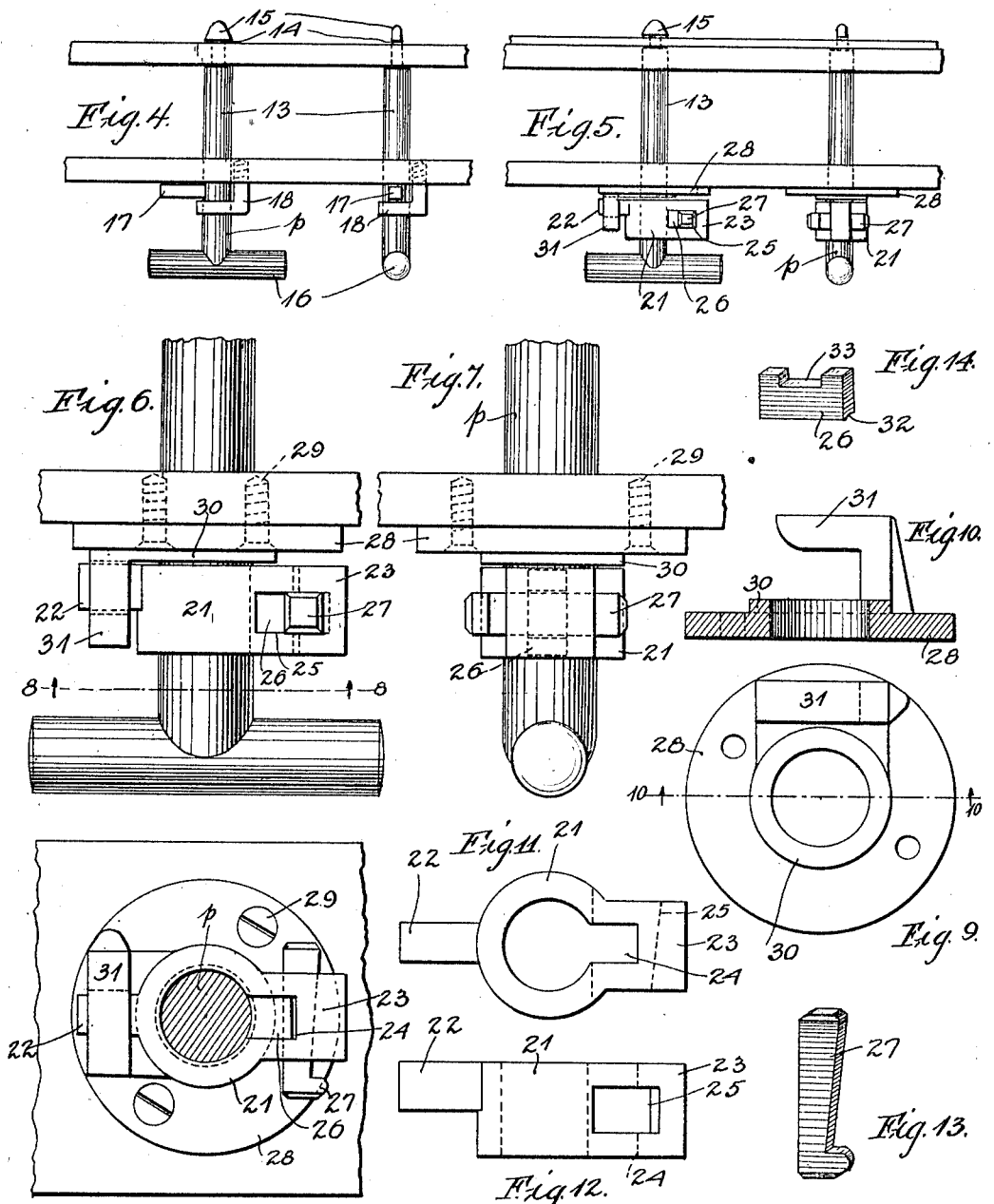

MITCHELL F. McCARTHY, OF NEW YORK, N. Y.

MOLDING MECHANISM.

1,001,288.   Specification of Letters Patent.   Patented Aug. 22, 1911.

Application filed March 31, 1910. Serial No. 552,714.

*To all whom it may concern:*

Be it known that I, MITCHELL F. MCCARTHY, a resident of New York, in the county of New York and State of New York, have invented certain new and useful Improvements in Molding Mechanism, of which the following is a full, clear, and precise specification.

My invention relates to molding mechanism for molding cementitious structural units.

My invention is particularly adaptable for molding structural units such as shown in my co-pending applications executed of even date herewith and comprising rectangular body parts having a rim extending from one face about the periphery thereof and having channels in the rim outer faces for forming sealing material pockets or key pockets when the units are arranged together.

Among the salient objects of my invention are to provide an interior adjustable stop-off structure coöperating with an external main frame to form the mold for receiving the cementitious material; to provide abutment and margining pins engaging with the external frame and the stop-off frame to lock said frames in relative position; to provide a construction which will enable the pins to be readily inserted and withdrawn and to be securely and detachably locked with the external and stop-off frames; to provide said external frame with means for producing the desired channeling of the units during the molding operation; to provide a knock-down construction for the external frame; to provide a plurality of sections for the stop-off frame which can be easily assembled to form the stop-off frame and which can be readily taken apart and removed from the finished unit; and in general to provide improved molding apparatus which can be quickly connected together and adjusted for desired shapes, which is firm and rigid during the molding operation, and which can be quickly and readily taken apart to release the finished units.

Various embodiments of my invention are clearly described in the following specification and illustrated on the accompanying drawings, in which drawings—

Figure 1 is a plan view of molding apparatus, Fig. 2 is a sectional view taken on plane 2—2, Fig. 1, Fig. 3 is a sectional view taken on plane 3—3, Fig. 1, Fig. 4 is an enlarged plan view of adjacent sections of the external and stop-off frames, showing the construction and operation of margining pins, Fig. 5 is a similar plan view, showing the marginal pins provided with adjustable latch pins, Fig. 6 is an enlarged plan view showing the adjustable latch pin mechanism for a marginal pin and the latch frame coöperating therewith, Fig. 7 is a view taken from the right of Fig. 6, Fig. 8 is a view taken from plane 8—8, Fig. 6, Fig. 9 is a plan view of the latch frame for coöperating with the adjustable latch pin, Fig. 10 is a sectional view taken on plane 10—10, Fig. 9, Fig. 11 is a front view of the adjustable latch pin and supporting frame, Fig. 12 is a top view thereof, Fig 13 is a perspective view of a wedge pin, and Fig. 14 is a perspective view of a wedge block forming part of the adjustable latch pin mechanism.

A table 1 forms a base for the molding apparatus which comprises end blocks 2 and built up blocks or walls 3. As best shown in Fig. 3, the side walls comprise a base block 4, an intermediate plate 5 and the angle bar 6, the block 4, plate 5 and horizontal flange of the angle bar being held together by screws 7. The inner ends 8 of the plate 5 are rounded, as shown, and extend a distance beyond the inner faces of the blocks 4, while the inner faces of the vertical flanges of the angle bars are slightly outside of the inner faces of the blocks 4, and the vertical flanges of the angle bars tlso support strips 9. With this arrangement the outer faces of the unit cast in the mold will have a channel for receiving sealing material and will have a semi-T-shaped channel for receiving locking keys.

The stop-off structure shown comprises four sheet iron corner frames 10$^a$, 10$^b$, 10$^c$ and 10$^d$, whose inner ends overlap or telescope together so that the stop-off structure is adjustable lengthwise and sidewise to form different sized cores for the molding mechanism. As shown in Fig. 1, the end and side walls 2 and 3 are laid on the table 1 to form a rectangular external frame of the proper size, and the sections of the stop-off frame are adjusted and are inserted inside the external frame parallel thereto and with their edges in engagement with the table. For the particular units for which the apparatus is designed the height of the stop-off frame is less than that of the external frame, as best shown in Figs. 2 and 3, and when molding material is filled in over the stop-off frame and between said frame and the external frame the resulting unit will be of rectangular form with a rim extending about its periphery on one face thereof, the other face being plane. The upper walls of the stop-off frame sections are prevented from deflecting during the molding operation by means of supporters 11, which may be in the form of boards set on edge and suitably alined and held together by bolts 12.

As a means for maintaining the relative positions of the external and stop-off structures and also for locking the external frame walls together, I provide marginal or locking pins $p$. The construction of these pins is best shown in Figs. 4 and 5, each pin having a cylindrical shank 13 having a reduced end 14 terminating in a locking head 15 whose greatest width is preferably slightly less than the diameter of the pin shank. The other end of the shank has a handle 16, and, as shown in Figs. 1 to 4, the shank is provided with a permanent latch pin 17 for coöperating with a latch frame 18 secured to the walls of the external frame. The vertical walls of the stop-off frame sections are provided with slots 19, and the walls of the external frame have passageways 20. After the external frame and the stop-off frame have been relatively adjusted on the table 1 the shanks of the pins are inserted through the openings 20 and their locking heads 15 passed through slots 19 of the stop-off frame, whereupon the pins are turned to position the locking heads 15 cross-wise of the slots 19 so that the walls of the stop-off frame are locked to the pin ends between the heads and the ends of the shank sections 13, this locking position being maintained by the locking engagement of the latch pins 17 with the latch frames 18 upon turning of the pins to bring the heads 15 in locking position. When the pins are all in locking position the stop-off frame will be locked in proper position relative to the external frame and the external frame end and side walls will be locked together. The cementitious material can now be poured into the mold and tamped securely in place without danger of separation or distortion of the mold parts. After setting of the molding material the pins are turned back to unlocking position and withdrawn from the frames whereupon the end and side walls of the external frame can be removed from the exterior of the formed unit, and the sections of the stop-off frame can be released and extracted from within the rim of the formed unit.

In Figs. 5 to 14 adjustable latch pin mechanism for the margining pins is shown, this adjustable mechanism enabling the margining pins to be adjusted in correspondence with the adjustment of the stop-off frame parts. A collar 21 fitting the shanks of the margining pins has a latch pin 22 extending therefrom, and at its opposite end has a lug 23 having an axially extending rectangular pocket 24 communicating with the interior of the collar, and having a keyway 25 extending across the pocket 24 perpendicularly thereto. The pocket 24 serves to receive a wedge block 26, best shown in Fig. 14, and the keyway receives a wedging key 27, best shown in Fig. 13. A circular latch plate 28 is secured to the external frame walls by screws 29, and has the central hub 30 for receiving the margining pin shanks. At an intermediate point a latch hook 31 extends from the latch plate, as shown. In assembling the adjustable latch pin mechanism the wedge pin 27 is inserted in its wedge pocket 25, and the wedge block 26 is then applied in its pocket 24 with its cylindrical surface 32 inwardly and with its opposite notched edge 33 extending into the wedge pocket to receive the inner edge of the wedge pin. The collar 21 is then slipped over the shank of a margining pin, and when the latch pin 22 thereon reaches the proper position the wedge pin 27 is driven in to force the wedging block 26 into wedging engagement with the shank thus to lock the latch pin collar in its adjusted position. Adjustment can thereafter at any time be made by merely loosening the wedge pin, sliding the latch pin collar to its desired position, and then re-tightening the wedge pin. The margining pin can then be turned to carry the latch pin into latching engagement with the latch hook 31 to hold the locking head of the margining pin in its locking position with reference to the stop-off frame.

I thus provide molding apparatus of knock-down construction whose parts can be quickly assembled to form an external molding frame and an internal stop-off or core frame, which frames can be readily adjusted for different shapes and sizes of work and which frames are securely held together and locked in relative adjusted position by means of adjustable locking or margining pins. After forming of a unit in the molding apparatus the locking pins can be quickly extracted to leave the apparatus parts free to be withdrawn from the finished article.

I do not desire to be limited to the precise construction, arrangement or adjustment shown and described, as modifications are possible which would come within the scope of my invention, and I, therefore, claim the following:

1. In molding apparatus, the combination of an external frame, an internal stop-off or core frame, margining pins pivoted in said external frame and having locking engagement with the inner frame, latch mechanism on the external frame, and coöperating latch mechanism on said margining pins, said latch mechanism on said margining pins being longitudinally adjustable thereon whereby the length of said pins between said external and internal frames may be adjusted.

2. In molding apparatus, the combination of an external frame, an internal sectional adjustable stop-off or core frame, margining pins extending through the walls of said external frame and having detachable locking engagement at their inner ends with the side walls of said internal frame, a latch hook mounted on said external frame adjacent each margining pin, and a latch tongue mounted on each margining pin for engaging in the corresponding latch hook whereby said margining pins are locked with reference to said external frame to rigidly hold the internal frame in adjusted position.

3. In molding mechanism, the combination of an external frame, an internal longitudinally and transversely adjustable stop-off or core frame, margining pins extending through and pivoted in walls of said external frame and having locking heads at their inner ends, the walls of said internal frame having slots through which said locking heads may be extended to lock the inner ends of the pins to the internal frame upon slight turning of said pins, and latch mechanism mounted on said external wall and said pins to be brought into locking engagement to lock the pins to the external frame upon turning of said pins to engage their inner locking heads in locking engagement with the internal frame.

4. In molding mechanism, the combination of an external frame, an internal longitudinally and transversely adjustable stop-off or core frame, margining pins extending through and pivoted in walls of said external frame and having locking heads at their inner ends, the walls of said internal frame having slots through which said locking heads may be extended to lock the inner ends of the pins to the internal frame upon slight turning of said pins, a latch hook mounted on the external frame adjacent each margining pin, and a latch tongue adjustable longitudinally on each margining pin, said latch tongues being brought into latching engagement with the latch hooks to lock the pins to the external frame upon turning of said pins to bring their locking heads into locking engagement with the internal frame.

5. In molding mechanism, the combination of an external frame, an internal stop-off or core frame, margining pins extending through and pivotal in said external frame and having locking engagement at their inner ends with said internal frame, a latch hook on said external frame adjacent each margining pin, and a collar adapted to be secured at any position on each pin longitudinally thereof, each collar having a locking tongue to be carried into locking engagement with the corresponding latch hook on turning of the pin.

6. In molding apparatus, the combination of an external frame, an internal longitudinally and transversely adjustable stop-off or core frame, margining pins having rotatable and longitudinal sliding engagement in said external frame and having pivotal engagement at their inner ends in said internal frame, a latch tongue for each pin, a supporting frame for each pin slidable thereon to enable the pin to be adjusted to follow the adjustment of the internal frame, wedge mechanism in each frame for clamping said frame in adjusted position to the pin, and a latch hook mounted on the external frame adjacent each pin to receive the tongue of the pin upon rotation of the pin to lock the pins against longitudinal displacement in said external frame.

In witness hereof, I hereunto subscribe my name this 25th day of March, A. D. 1910.

MITCHELL F. McCARTHY.

Witnesses:
Thomas E. Cowart,
Jesse W. Tobey.